United States Patent [19]

Crawford

[11] 4,276,474

[45] Jun. 30, 1981

[54] INFRARED FOCAL PLANE WITH AUTOMATIC RESPONSIVITY CONTROL USING PHOTODETECTOR BIAS MODULATION

[75] Inventor: Fred I. Crawford, Manhattan Beach, Calif.

[73] Assignee: Hughes Aircraft Company, Culver City, Calif.

[21] Appl. No.: 87,287

[22] Filed: Oct. 22, 1979

[51] Int. Cl.³ ............................ G01J 1/00; G01J 1/42
[52] U.S. Cl. .................................... 250/349; 250/394
[58] Field of Search ............... 250/332, 334, 349, 338, 250/394

[56] References Cited

U.S. PATENT DOCUMENTS

| | | | |
|---|---|---|---|
| 3,535,521 | 10/1970 | Levine | 250/349 |
| 3,700,905 | 10/1972 | Parkin et al. | 250/349 |
| 4,013,889 | 3/1977 | Fryer | 250/349 |

*Primary Examiner*—Alfred E. Smith
*Assistant Examiner*—Janice A. Howell
*Attorney, Agent, or Firm*—Robert M. Wallace; William H. MacAllister

[57] ABSTRACT

Automatic responsivity control for an array of infrared photodetectors is provided without additional hardware such as a beam chopper or a reference object of known irradiance. The requisite modulated reference signal is provided instead by uniformly modulating the bias voltage applied to each of the plurality of photodetectors in the array. Photodetectors having different responsivities respond to the same bias modulation differently to produce a superimposed sinusoidal component in the photodetector output current which is used to compensate for differences in responsivities of the individual photodetectors. For this purpose, an automatic responsivity control circuit selects the superimposed sinusoidal component from the photodetector output current corresponding to the frequency of the reference signal modulating the bias voltage, and compares the amplitude of the selected sinusoidal component with a reference level to adjust the amplification at the photodetector output in accordance with this comparison, so that the amplified outputs from the plurality of photodetectors respond uniformly to the sinusoidal reference signal applied as a bias voltage to the photodetectors.

14 Claims, 5 Drawing Figures

INFRARED FOCAL PLANE WITH AUTOMATIC RESPONSIVITY CONTROL USING PHOTODETECTOR BIAS MODULATION

TECHNICAL FIELD

This invention relates to focal plane imaging devices comprising a plurality of semiconductive photodetectors in which automatic responsivity control is required to compensate for variation in the responsivity of individual photodetectors.

BACKGROUND ART

Imaging devices made of a plurality of photodetectors overlying a semiconductive substrate which is optically scanned across a field of view are well known in the art. Such imagers may use infrared photodetectors such as mercury cadmium telluride photodetectors formed on the surface of a semiconductive substrate. Alternatively, the substrate may be mercury doped germanium divided into a plurality of photodetectors. The photodetectors may be arranged in a single line to form a linear focal plane which is scanned in parallel fashion across a field of view to generate an output which is multiplexed to provide a video signal analogous to a television signal. In area focal planes, the photodetectors are arranged in a plurality of columns of photodetectors, the image being scanned in parallel with the columns to provide time domain integration of the image signal in each column, as discussed in Sequin et al., *Charge Transfer Devices*, Academic Press, N. Y. (1975), pp. 142–200. In both linear sensors and area sensors, system performance is limited because the optical responsivities of the individual photodetectors in the focal plane are typically nonuniform. The resulting television image will therefore be nonuniform in intensity and contrast if the variations in individual photodetectors reponsivities are significant. This problem has been solved in the prior art by providing an external source of known irradiance which is modulated at a selected frequency. An automatic responsivitiy control (ARC) circuit at the output of each photodetector selects the frequency component of the photodetector output signal corresponding to the frequency of the known source and compares its amplitude with a selected reference to adjust the amplification at the photodetector output in accordance with this comparison, so that the amplified outputs from the plurality of photodetectors respond uniformly to the external source of known irradiance. If the photodetectors are infrared sensors, the modulated source will typically be an object maintained at a known temperature shielded by a beam chopper which is rotated at the selected frequency. The ARC circuit for each detector includes a variable gain amplifier at the photodetector output connected to a digital filter turned to the modulated frequency, and a differential amplifier for comparing the output of the digital filter with a reference source to produce a voltage controlling the gain of the variable gain amplifier.

This type of automatic responsivity control therefore requires additional hardware including an object maintained at a known temperature and a rotating beam chopper or other modulating device, which adds weight, volume and complexity to the system, a significant disadvantage.

SUMMARY OF THE INVENTION

In this invention, automatic responsivity control is provided with out additional hardware such as a beam chopper or a reference object of known irradiance. The requisite modulated reference signal is provided instead by uniformly modulating the bias voltage applied to each of the plurality of photodetectors in the focal plane.

Semiconductive photodetectors generate a current output in response to photons incident on the semiconductive material under the influence of an electrical field applied to the photodetector by a bias voltage. In this invention, a sinusoidal reference signal having a predetermined frequency and amplitude is applied as a bias voltage to all of the photodetectors in a focal plane in addition to the d.c. bias voltage already present. It has been discovered that the modulation of the detector bias voltage generates a sinusoidal component superimposed on the photodetector output current having a frequency and amplitude corresponding to the frequency and amplitude of the applied reference signal, the amplitude of the superimposed component in the photodetector output also being proportional to the photodetector responsivity. Therefore, photodetectors having different responsivities respond to the same bias modulation differently to produce a superimposed sinusoidal component in the photodetector output current which may be used to compensate for differences in responsivities of individual photodetectors in a focal plane. For this purpose, an automatic responsivity control circuit selects the superimposed sinusoidal component from the photodetecor output current corresponding to the frequency of the reference signal modulating the bias voltage, and compares the amplitude of the selected sinusoidal component with a reference level to adjust the amplification at the photodetectors output in accordance with this comparison, so that the amplified outputs from the plurality of photodetectors respond uniformly to the sinusoidal reference signal applied as a bias voltage to the photodetectors. Thus, automatic responsivity control may be provided to compensate for nonuniform responsivities in a focal plane of a plurality of photodetectors without requiring the use of an external source of known irradiance and a beam chopper, which reduces the complexity and volume of the system, a significant advantage.

The invention is preferably used in focal planes having infrared photodetectors, each of which is surrounded by an opaque structure defining the aperture of each photodetector and maintained at a known temperature to provide a background source of radiation which is uniform from detector to detector and which dominates the radiation or scene viewed through each aperture by each detector. The photodetector output current response to the bias voltage modulation is determined not only by the photodetector responsivity but is also determined by the incident photon flux on each detector, which may vary spatially and in time from detector to detector due to variations in the scenery or radiation viewed through each aperture by each photodetector. However, as long as the background radiation emitted by the aperture-defining structure surrounding each photodetector is uniform from photodetector to photodetector and provides the dominant amount of photon flux incident on each photodetector, such time and spatial variations in scenery or radiation viewed through the aperture will be negligible in comparison with the background radiation, so that automatic responsivity control is provided in a uniform manner from detector to detector. It is contemplated, of course that the detector response generated by modulation of the bias voltage of the photodetectors will be filtered out prior to display of the video signal.

BRIEF DESCRIPTION OF THE DRAWINGS

The invention is best understood by reference to the accompanying drawings of which.

DETAILED DESCRIPTION OF THE INVENTION

Figure 1:
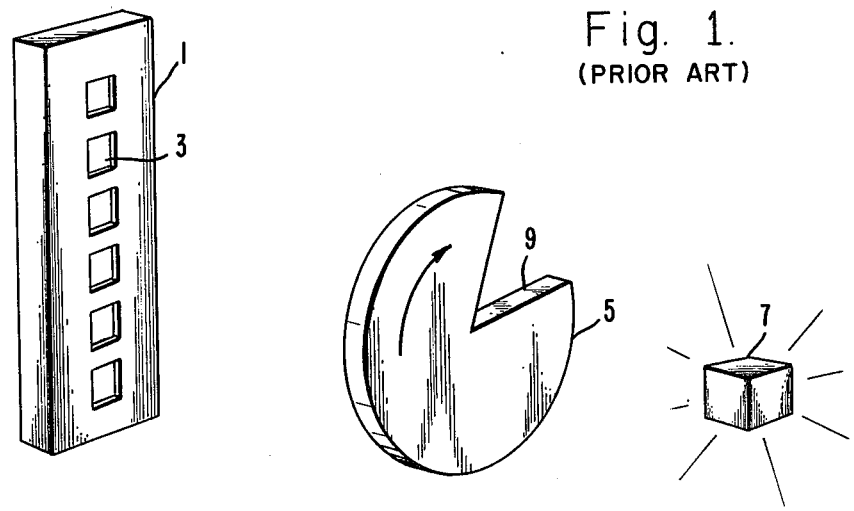
FIG. 1 is a simplified illustration of a source of known irradiance and a beam chopper generating a modulated reference source or radiation incident on a linear focal plane array in the manner of the prior art.

FIG. 1 illustrates a linear focal plane array 1 comprising a plurality of photodetectors 3 arranged in a vertical column. The focal plane array 1 may be, for example, a starting array which views a scene in a field of view through an aperture (not shown in FIG. 1). Each of the photodetectors 3 generates an output current under the influence of an applied D.C. electric field in the photodetector 3 in response to light incident on the detector 3. The output current $I_{out}$ from each photodetector 3 is equal to the power P of the photon beam incident upon that detector multiplied by the responsivity R of the detector. The output current generated by each of the photodetectors 3 is multiplexed with the output from the other photodetectors 3 to form a video signal producing a television picture. In order for the resulting television picture to be uniform in brightness and contrast, the responsivity R of each one of the detectors must not vary significantly from detector to detector. Photodetector focal plane arrays and in particular, linear image sensors are discussed in Sequin, et al., *Charge Transfer Devices*, N. Y. (1975), pp. 142-152. Although the Sequin publication is directed toward charge coupled device imagers, it is understood that the focal plane array 1 of FIG. 1 maybe of any type known in the art and is not necessarily a charge coupled device.

A significant problem in the art is that responsivities of individual photodetectors 3 vary significantly, causing the brightness and contrast of the resulting television signal to be nonuniform. One prior art method for solving this problem is to provide a beam chopper 5 shielding a source 7 of known irradiance from the focal plane 1 and having an aperture 9 which modulates the radiation from the known source 7 incident on the focal plane 1 at a frequency corresponding to the angular frequency of rotation of the beam chopper 5 about its axis 11. Compensation for variations in responsivity of the individual photodetectors 3 is performed by an automatic responsivity control circuit (not shown in FIG. 1) controlling amplification of the output current $I_{out}$ from an individual photodetector 3. The control circuit operates at a frequency corresponding to the angular frequency of rotation of the beam chopper 5, and thus can select out the response of the photodetector 3 to the source 7 of known irradiance exclusively to compare the selected response with a reference voltage level. The results of the comparison are used to control the amplification of the output current $I_{out}$ of the detector 3. As long as an automatic responsivity control circuit for each photodetector 3 makes this comparison with the same reference voltage level, the amplified response of each of the photodetectors 3 to the source 7 of known irradiance will be uniform, thus assuring a uniform television picture. The disadvantage of the prior art arrangement illustrated in FIG. 1 is that the beam chopper 5 and the source of known irradiance 7 add to the weight, complexity and volume of the system, a significant disadvantage.

Figure 2:
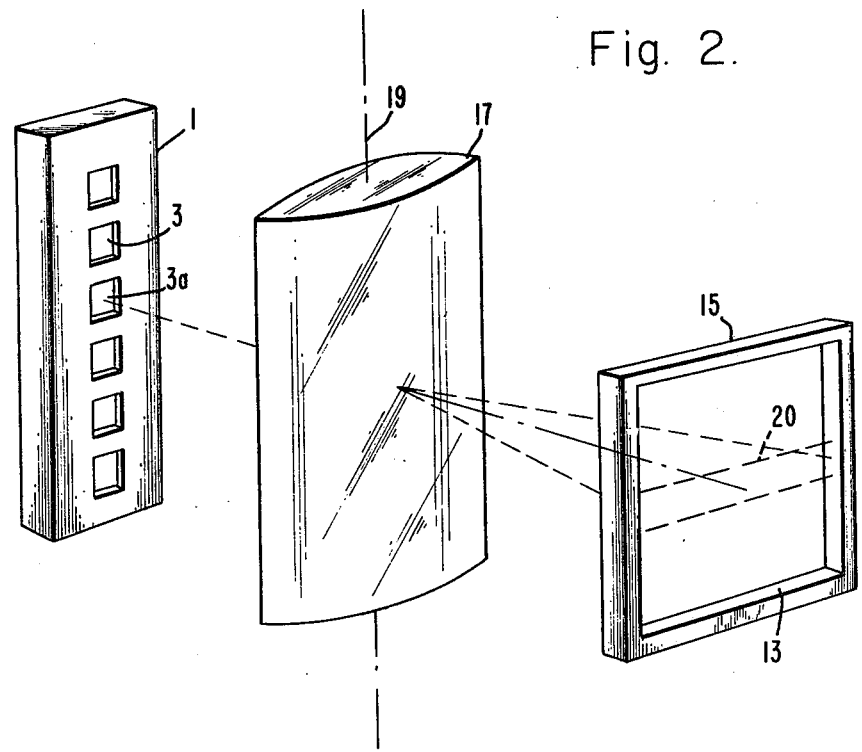
FIG. 2 is a simplified illustration of a linear focal plane array of photodetectors which is optically scanned in parallel across the field of view.

In the present invention, automatic responsivity control is provided without the necessity of the beam chopper 5 and the source 7 of known irradiance. FIG. 2 illustrates the linear focal plane array of photodetectors 3 which is parallel scanned across a field of view 13 defined by an aperture 15 in accordance with the rotation of an optical device 17 about an axis 19. (Parallel scanning of the focal plane array 1 by the optical device 17 is performed in a manner well known to those skilled in the art so that a single detector, such as, for example, the detector 3a, is scanned across a horizontal strip 20 in the field of view 13 so that the detectors 3 in the focal plane array 1 scan the entire area of the field of view 13.) responsivity control for the plurality of photodetectors 3 of FIG. 2 is provided by the automatic responsivity control circuit of the present invention illustrated in the schematic diagram of FIG. 5, which eliminates the necessity of the beam chopper 5 and the known source 7, which are therefore absent in the arrangement of FIG. 2 in accordance with the present invention.

Figure 3:
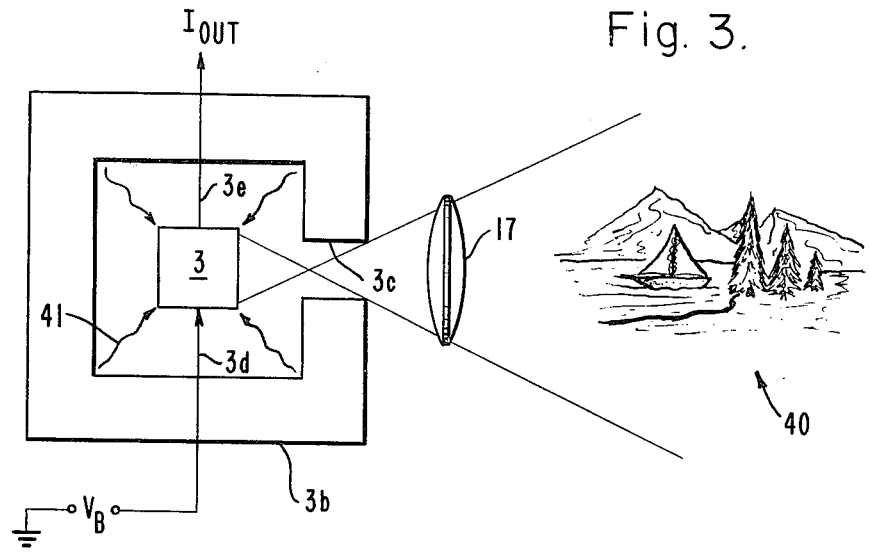
FIG. 3 is a simplified plan view of a typical individual detector of the type used in the linear focal plane array of FIG. 2.

In this invention, the requisite modulated reference signal, which in the prior art is furnished by the beam chopper 5 and the source 7 of known irradiance, is provided instead by modulation of the bias voltage applied to each of the photodetectors 3. Referring to FIG. 3, each photodetector 3 is surrounded by an aperture defining structure 3b which is maintained at a predetermined temperature, which is preferably 77° C. if the photodetector 3 is an infrared photodetector. Radiation viewed through an aperture 3c defined by the structure 3b is incident upon the detector 3. If a suitable bias voltage $V_b$ is applied to one termnal 3d of the detector 3, the photodetector 3 generates an output current $I_{out}$ at another terminal 3e. It has been discovered that by modulating the bias voltage applied to the terminal 3d, the output current $I_{out}$ is modulated at a frequency corresponding to the modulation of the bias voltage, and at an amplitude determined by the responsivity of the detector 3. Thus, if the bias voltages of an array of photodetectors having the same responsivity are modulated uniformly, the photodetectors will each product the same modulated response. Likewise, if the bias voltages of an array of photodetectors having different responsivities are modulated, each detector will generate a different modulated response, which may be used to adjust the gain of each amplified detector signal so as to compensate for nonuniform detector reponsivities. This discovery is utilized by the automatic responsivity control circuit of the present invention illustraes in FIG. 5, including a constant bias voltage $V_b$ applied to the electrode 3d of each photodetector 3 and a sine wave generator 21 (replacing the radiation source 7 and beam chopper 5) superimposing a sinusoidal reference voltage over the constant bias voltage $v_b$. The frequency of the sine wave generator 21 may be selected to correspond to the angular frequency of rotation of the beam chopper 5, while the amplitude of the sine wave voltage output from the generator 21 may be selected to generate an output current $I_{out}$ from each photodetector 3 which is equivalent to the output current generated by the beam chopper 5 and source 7 in the proir art arrangement of FIG. 1, although such a selection is not necessry for successful operation of the circuit of FIG. 5.

Again referring to FIG. 5, the output current $I_{out}$ from the output electrode 3e of each photodetector 3 is applied to input 25a of an operational amplifier 25 which produces a voltage at its output 25b proportional to the current $I_{out}$. A digital filter 27 of the type well known in the art operates at the frequency of the sine wave generator 21 and feeds the corresponding frequency component of the signal from the amplifier output 25b to one input 29a of a differential amplifier 29. The amplitude of this component is a direct measure of the detector response to the bias voltage modulation by the sine wave generator 21. The differential amplifier 29 compares the amplitude of this component from the output of the digital filter 27 with a reference voltage $V_r$ applied to its other input 29b, and applies the corresponding difference voltage generated at its output 29c to the gate of a field effect transistor 31 controlling resistance in a positive feedback loop between the output 25b and the input 25a of the operational amplifier 25. If the photodetector response is too high, the differential amplifier 29 will sense a positive difference, and will apply a positive voltage to the gate of the transistor 31, which in this example is a p-channel device so that its resistance increases, thereby reducing the amount of positive feedback applied to the amplifier 25, and this gain is reduced in proportion to the difference sensed by the differential amplifier 29. Alternatively, if the output of the digital filter 27 applied to the differential amplifier input 29a is less than the reference voltage $v_r$, the differential amplifier 29 senses a negative difference to generate a negative voltage at its output 29c which decreases the resistance of the transistor 31 to the amplifier 25, thus increasing the gain in proportion to the negative difference sensed by the differential amplifier 29.

Figure 5:
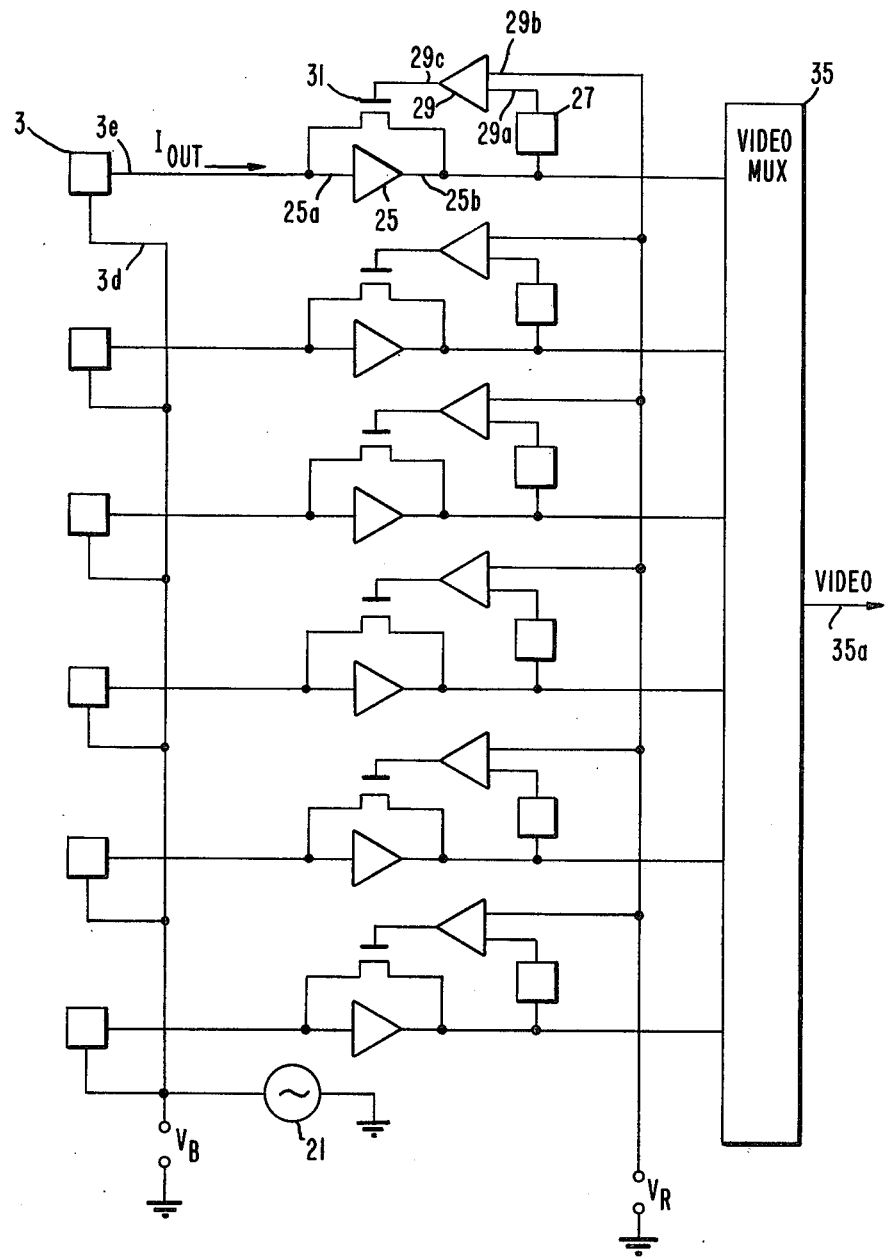
FIG. 5 is a schematic diagram of the automatic responsivity control circuit of the present invention which eliminates the necessity of the beam chopper and radiation source of FIG. 1.

If the responsivity R of each photodetector 3 is the same, the response to the sinusoidal voltage applied to the bias voltage terminal 3d by the sine wave generator 21 will be uniform from detector to detector, so that each filter 27 generates an output voltage which is the same for all digital filters 27 in the circuit of FIG. 5, and the gain of all the feedback loops comprising the operational amplifiers 25 and the feedback transistors 31 is the same. However, if the responsivities of the various photodetectors 3 are different, their response to the sinusoidal reference voltage applied by the sine wave generator 21 through the bias terminals 3d of each of the photodetectors 3 will be nonuniform so that a different voltage will be produced at the output of each digital filter 27 in proportion to the individual responsivity of each detector. However, each of the differential amplifiers 29 operates to set the gain of each feedback loops 25, 31 to null the difference between the reference voltage $v_r$ and the output of each digital filter 27. As a result, the feedback gain of each operarational amplifier 25 is adjusted to compensate for nonuniformities in the responsivities of the various photodetectors 3 so that a uniform response to the sinusoidal reference applied to the bias terminals 3d of the photodetectors 3 is achieved for all photodetectors.

The output 25b of each amplifier 25 is applied to a parallel input of a multiplexer 35 which multiplexes the responses of the plurality of photodetectors 3 to produce a multiplexed video signal at its output 35a which may be utilized, for example, as a television signal.

Figure 4:
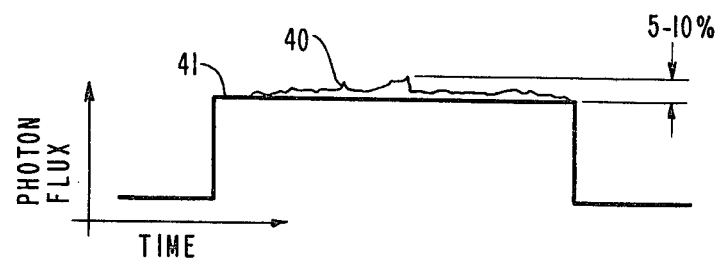
FIG. 4 is a time domain graph illustrating the photon flux incident on the detector of FIG. 3 as function of time.

One apparent difficulty with the automatic responsivity control prodivided by the circuit of FIG. 5 is that time or satial variations in the radiation incident upon each of the detectors 3 will cause variations in the detector response to the sinusoidal reference voltage applied by the sine wave generator 21 to the detector bias, which will cause the automatic responsivity control circuit of FIG. 5 to vary the feedback gain of various ones of the operational amplifiers 25 without variations in detector responsivity. However, this problem does not exist for practical applications of the automatic responsivity control circuit of FIG. 5 because it is contemplated that it will be utilized with photodetectors surrounded by an aperture defining structure 3b illustrated in FIG. 3 which is maintained at a predetermined temperature. Thus, each photodetector 3 receives radiation from a scene 40 in its field of view defined by a narrow aperture 3c. In the preferred embodiment, the photodetector 3 is an infrared photodetector and the surrounding structure 3b is maintained at a temperature of 77° C. The scene 40 is viewed against the background of blue sky or other relatively cold background. As a result, most of the background photon flux 41 incident on the photodetector 3 emanates from the surrounding structure 3b and is determined by the maintained temperature of the structure 3b, while only a fraction of the photon flux incident on the detector 3 is due to photons from the scene 40 passing through the aperture 3c. As a result, the total photon flux incident on an individual detector 3 is constant in time to within 5 or 10 percent due to the dominating background radiation 41 from the surrounding structure 3b, while a fractional amount of photon flux from the scene 40 is superimposed over the background, as illustrated in FIG. 4. The 5 to 10 percent spatial or time variation in photon flux on the detectors is insignificant in comparison to the 50 to 100 percent deviation in photodetector responsivity for which the circuit of FIG. 5 must compensate. Therefore, the effect of spatial or time variations in photon flux due to the variation in scenery radiation on the operation of the automatic responsivity circuit of FIG. 5 is negligible.

While not subscribing to any particular theory, the following intuitive explanation of the relation between photodetector responsivity and the photodetector response to bias voltage modulation is given. The responsivity R of each photodetector is the normalized outut current in amperes from a photodetector generated by a watt of power of a photon beam incident on the detector. The responsivity may be given by the following equation:

$R = G\, V_b\,(1/E)$, where R is the responsivity of amps per watt, $V_b$ is the D.C. bias voltage applied to the photodetector, E is the photon energy and G is called the d.c. gain of the photodetector and is given by the following equation:

(2) $G = e\eta\mu\tau/s^2$, where e is the electronic charge, $\eta$ is the quantum efficiency of the detector given in output current electrons or holes per incident photon, $\nu$ is the minority carrier lifetime in the detector and s is the length between the bias voltage terminal 3d and the outut current terminal 3e of the detector.

The detector length s, the carrier lifetime, $\tau$ and the quantum efficiency $\eta$ may all vary from detector to detector, so that individual detectors have different d.c. gains G(and therefore different responsivities R) even though the photon energy E and the bias voltage $V_b$ may be the same. Therefore, a change in d.c. gain G will cause a proportional change in the responsivity R.

The output current $I_{out}$ generated by a particular photodetector for a constant photon flux N given in photoons per second is governed by the following equation:

$I_{out}(d.c.) = N \; G \; V_b$. If the photon flux is not constant in time, this equation becomes much more complex. Nevertheless, for the simple case of a constant photon flux, the output current $I_{out}$ from a particular photodetector will vary with variations in the bias voltage $V_b$ in proportion to the d.c. gain G in accordance with this equation. Therefore, nonuniformities in the d.c. gain G in each of the plurality of photodetectors receiving an incident photon flux N may be measured by modulating the bias voltage $V_b$ of each photodetector, in accordance with the present invention. As discussed previously, the photon flux N may be considered to be a constant value because each photodetector receives a constant amount of background radiation from its surrounding aperture-defining structure 3b illustrated in FIG. 3 which dominates all sources of radiation incident on the detector 3. Therefore, in the simple case of a constant photon flux N, variations in the d.c. gain G may be accurately observed by varying the bias voltage $V_b$ and measuring the resulting modulation of the output current $I_{out}$.

This invention thus achieves automatic responsivity control of a plurality of photodetectors in a focal plane without the use of an external source of radiation and a beam chopper by uniformly modulating the bias voltage applied to a plurality of photodetectors. It should be recognized that the automatic responsivity control circuit of FIG. 5 is equally useful on both linear focal plane arrays and area focal plane arrays comprising either solid-state line scanners, solid-state area scanners or any type of charge transfer device imager of the type discussed in the Sequin publication referenced above. It should also be recognized that other variations of the invention not disclosed in this specification may be useful which do not depart from the true scope of the invention. For example, the differential amplifier 29 may be replaced by any device which generates an output voltage proportional to the difference between the output of the digital filter 27 and a selected reference voltage $V_r$. Furthermore, the digital filter 27 may be replaced by any device which is tuned to the frequency component of the sine wave generator 21. Such a device may include, for example, an inductive and capacitive tank circuit or bandpass filter of the type well known in the art tuned to a very high Q. Also, the field effect transistor 31 may be replaced by any voltage controlled variable resistive element. The feedback loop comprising the differential amplifier 29 and the digital filter 27, the operational amplifier 25 and the transistor 31 may be connected in any manner which permits the loop to null the voltage difference between the output of the filter 27 and the reference voltage $V_r$. The operational amplifier may be replaced, for example, by a differential amplifier, one of its input connected to receive the photodetector output current $I_{out}$, and the other of its inputs connected to receive feedback from the transistor 31 to provide negative feedback instead of positive feedback. The condution polarity of the transistor 31 may be changed accordingly or the polarity of the input voltage applied to the differential amplfier 29 may be reversed. The sine wave generator 21 may be replaced by any device which generates a time varying voltage having a particular frequency to which the filter 27 is tuned.

Finally, it should be recognized that the structure 3b surrounding the infrared detector 3 may be maintained at a predetermined temperature other than the temperature of 77° C. discussed previously, where the selection of the temperature of the surrounding structure 3b depends upon the temperature of scenery which is to be viewed through and aperture 3c and upon the desired system sensitivity in a manner well known to those skilled in the art.

I claim:

1. A method for amplitude modulating the output current of a photodetector in proportion to the responsivity of said photodetector, said photodetector generating said output current under the influence of an applied electric field in said photodetector in response to radiation incident upon the detector, comprising:
    amplitude modulating said electric field.

2. A method for amplitude modulating the output current of a photodetector in proportion to the responsivity of said photodetector at a selected frequency, said photodetector generating said output current under the influence of an applied electric field in said photodetector in response to radiation incident upon the detector, comprising:
    amplitude modulating said electric field at said selected frequency.

3. A method for observing the responsivity of a photodetector generating an output current under the influence of an applied electric field in said photodetector in response to radiation incident upon the photodetector, comprising:
    exposing said photodetector to a predetermined background level of radiation;
    amplitude modulating said applied electric field so as to amplitude modulate said output current; and
    observing the resulting amplitude modulation of said output current.

4. The method of claim 3 wherein said predetermined background level radiation dominates all radiation incident upon the photodetector.

5. The method of claims 3 or 4 wherein said amplitude modulating step is performed at a selected frequency and said observing step includes the additional steps of bandpass filtering the photodetector output signal at said selected frequency and then measuring the amplitude of the filtered signal.

6. The method of claim 3 wherein said electric field is applied by a bias voltage impressed across said photodetector, and said amplitude modulating step comprises amplitude modulating said bias voltage.

7. A system compensating for variation in the responsivity of a photodetector from a nominal responsivity, said photodetector generating an output signal in response to radiation incident on said photodetector under the influence of an electric field in said photodetector applied by a bias voltage impressed across said detector, comprising:
- a source of background radiation incident on said detector dominating all other radiation incident on said detector;
- a variable gain amplifier receiving said detector output signal;
- a voltage generator for amplitude modulating said bias voltage at a selected frequency;
- a bandpass filter device connected to the output of said amplifier and tuned to said selected frequency;
- means for comparing the output of said bandpass filter device with a reference level; and
- means for adjusting the gain of said variable gain amplifier in accordance with said comparison.

8. The system of claim 7 wherein said source of background radiation comprises a structure surrounding said photodetector which is maintained at a selected temperature, and wherein said photodetector is an infrared detector.

9. The system of claim 7 wherein said variable gain amplifier comprises an operational amplifier receiving said output signal as a current from said photodetector and generating a voltage in proportion to its variable gain.

10. The system of claim 7 wherein said voltage generator comprise a sine wave voltage generator.

11. The system of claim 7 wherein said bandpass filter device comprises a digital filter operating at said selected frequency.

12. The system of claim 7 wherein said bandpass filter device comprises an inductive and capacitive bandpass filter tank circuit tuned to said selected frequency.

13. The system of claim 7 wherein said comparison means comprises a differential amplifier having one of its inputs connected to the filtered output of said bandpass filter device and the other of its inputs connected to a selected reference voltage source.

14. The system of claim 7 wherein said gain adjusting means comprises a field effect transistor having its source and drain connected across the input and output of said amplifying means in a positive feedback loop, and its gate connected to the output of said comparison means.

* * * * *